(12) United States Patent
Eschenhagen et al.

(10) Patent No.: US 9,083,269 B2
(45) Date of Patent: Jul. 14, 2015

(54) METHOD FOR OPERATING AN ELECTRIC MACHINE

(75) Inventors: Marc Eschenhagen, Ludwigsburg (DE);
Rasmus Rettig, Hamburg (DE);
Franziska Kalb, Fichtelberg (DE);
Michael Merkle, Stuttgart (DE);
Werner Schiemann, Fellbach (DE);
Joachim Joos, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 170 days.

(21) Appl. No.: 13/876,951

(22) PCT Filed: Aug. 10, 2011

(86) PCT No.: PCT/EP2011/063731
§ 371 (c)(1),
(2), (4) Date: Jun. 7, 2013

(87) PCT Pub. No.: WO2012/045506
PCT Pub. Date: Apr. 12, 2012

(65) Prior Publication Data
US 2013/0257335 A1 Oct. 3, 2013

(30) Foreign Application Priority Data

Oct. 6, 2010 (DE) .......................... 10 2010 042 050

(51) Int. Cl.
*H02P 1/00* (2006.01)
*H02P 3/12* (2006.01)
(Continued)

(52) U.S. Cl.
CPC .............. *H02P 1/027* (2013.01); *F02N 11/087* (2013.01); *H02P 1/18* (2013.01); *A47L 9/2821* (2013.01); *A47L 9/2826* (2013.01); *F02N 2011/0874* (2013.01); *F02N 2250/02* (2013.01); *F02N 2300/106* (2013.01)

(58) Field of Classification Search
CPC ... A47L 9/2821; A47L 9/2826; A47L 9/2842; G05B 13/0275; G05D 16/2066
USPC .......................................... 318/508, 436, 159
See application file for complete search history.

(56) References Cited

U.S. PATENT DOCUMENTS 6,069,950 A * 5/2000 Knollman ...................... 379/413
6,353,522 B1 * 3/2002 Akahane ......................... 361/78
(Continued)

FOREIGN PATENT DOCUMENTS

DE 100 21 153 11/2001
DE 102 52 511 5/2004
(Continued)

OTHER PUBLICATIONS

International Search Report, dated Nov. 10, 2011, issued in corresponding PCT Application No. PCT/EP2011/063731.

*Primary Examiner* — Shawki S Ismail
*Assistant Examiner* — Bradley Brown
(74) *Attorney, Agent, or Firm* — Kenyon & Kenyon LLP

(57) ABSTRACT

A method and a circuit system for operating an electric machine are presented. The method is carried out in particular in a starting phase, a current being limited using a controllable resistor, the controllable resistor being implemented by at least one semiconductor switch, which is controlled using a clocked signal, and the signal being set in such a way that in shutdown phases, the at least one semiconductor switch is not completely shut down.

11 Claims, 8 Drawing Sheets

(51) Int. Cl.
*H02P 3/22* (2006.01)
*H02P 7/06* (2006.01)
*H02P 7/22* (2006.01)
*H02P 23/00* (2006.01)
*H02P 1/02* (2006.01)
*F02N 11/08* (2006.01)
*H02P 1/18* (2006.01)
*A47L 9/28* (2006.01)

(56) References Cited

U.S. PATENT DOCUMENTS 8,604,726 B2 * 12/2013 Hogg et al. .................. 318/139

2004/0168664 A1  9/2004 Senda et al.
2007/0137908 A1 *  6/2007 Fujiwara et al. ............. 180/65.2
2008/0252245 A1 * 10/2008 Chen et al. .................... 318/434
2009/0230879 A1 *  9/2009 Bergmann et al. ........... 315/291

FOREIGN PATENT DOCUMENTS

| DE | 10 2008 040724 | 1/2010 |
| EP | 0 387 729 | 9/1990 |
| EP | 1 041 277 | 10/2000 |
| EP | 10 41 278 | 10/2000 |
| EP | 2 148 084 | 1/2010 |
| JP | 2-281527 | 11/1990 |
| JP | 2010-34746 | 2/2010 |

* cited by examiner

METHOD FOR OPERATING AN ELECTRIC MACHINE

CROSS REFERENCE TO RELATED APPLICATIONS

The present application is the national stage entry of International Patent Application No. PCT/EP2011/063731, filed on Aug. 10, 2011, which claims priority to Application No. DE 10 2010 042 050.6, filed in the Federal Republic of Germany on Oct. 6, 2010.

FIELD OF INVENTION

The present invention relates to a method and a system for operating an electric machine.

BACKGROUND INFORMATION

Using a starter, which is usually designed as an electric machine, for example, as a DC machine, to start an internal combustion engine is known. During the startup of an electric machine or an electrical drive, for example, a starter in an internal combustion engine, high starting currents typically occur. Limiting them is an important task in order to minimize the vehicle electrical system voltage drop during the start in the motor vehicle, for example.

A device for controlling the current flow through a starter of an internal combustion engine is described in German Application No. DE 102 52 511 A1. A maximum allowed battery current is calculated therein by a first arithmetic unit. This maximum allowed battery current is provided to a second arithmetic unit, which in turn calculates a maximum allowed starting current in consideration of a prediction of the current consumption of further consumers.

A device for starting an internal combustion engine may be inferred from German Application No. DE 100 21 153 A1, in which a current limiting unit, using which a current flowing to the drive unit is limited to a predetermined amplitude value, is situated in a connection path between the vehicle battery and the drive unit.

An electronic contactor control for regulation of the DC feed in the event of a varying supply voltage by current pulsing and using a freewheeling circuit is described in European Application No. EP 387 729 A2. A freewheeling diode is provided to protect the circuit in the shutdown phases, i.e., in the phases having zero current.

The cited approaches for current pulsing using zero current in the cutoff or shutdown phases require a freewheeling diode to protect the circuit through high induced voltages in the shutdown phases, however.

Furthermore, a method for starting an internal combustion engine using a starter and a starter controller connected thereto is described in European Application No. EP 2 148 084 A2. In this method, a starter current is regulated in a defined way during the starting procedure by the starter controller, which includes electronic components. The starter current is controlled during the starting procedure and is not connected directly to the battery or to an energy store. The starter controller has a current regulating unit, which may in turn include a DC/DC converter.

European Application No. EP 1 041 277 B1 describes a starter regulating device for motor vehicles to prevent wear. Means for reducing the feed voltage at the beginning of the starting procedure are provided for this purpose.

A further option for limiting the current is provided by the temporary connection in series of an additional resistor. The total resistance in the closed circuit is thus increased sufficiently that the flowing current is limited to a defined value.

A starter for starting an internal combustion engine is presented in U.S. Patent Application Publication No. 2004/0168664 A1. In this context, a resistor for limiting a current is described, the current being set in such a way that the starting procedure may take place.

The use of a fixed resistor is disadvantageous because of its overall size and the heat development connected thereto. Since the resistor has a fixed value, it may not be adapted.

SUMMARY

The present invention therefore strives to achieve the current limiting in another way.

Against this background, a method for operating an electric machine and a system for carrying out the method are presented. Exemplary embodiments of the present invention are described herein.

The current limiting is therefore achieved by special modulation of the control voltage of the employed semiconductor switches or power switches. The occurring induced voltage may thus be minimized, so that the semiconductor switches may be protected. Furthermore, a series resistor may be omitted. The semiconductor switches produce a virtual ohmic series resistance in the supply line of the inductive load and thus limit the current.

One advantage of the system according to the present invention is the option in particular of controlling multiple semiconductor switches or power switches in parallel, i.e., via one terminal. In the configuration according to the related art, due to manufacturing-related differences and design-related variation of the local temperature at the semiconductor switches, each individual power contact must be measured between the semiconductor switches, which are switched in parallel in the power pathway, and the associated gate must be individually controlled in a suitable way. If this is not performed with sufficient precision, a single semiconductor switch or power semiconductor, generally the one having the lowest resistance between drain and source, contributes more strongly to the total current than the others. It heats up more intensely and may thus be damaged.

Through a parallel control according to one exemplary embodiment of the described method, the circuitry outlay may be significantly reduced and nonetheless balanced utilization of the participating semiconductor switches may be achieved.

A system according to the present method provides multiple decisive advantages with respect to the related art. Thus, by avoiding a complete shutdown having sharp switching edges, the current may be limited due to inductive loads, without generating a high induced voltage. The circuitry outlay may thus be reduced because, for example, no freewheeling diodes are required. Furthermore, the use of switched series resistors may be omitted. The circuitry outlay and therefore the costs are thus reduced.

Furthermore, the gate contacts of the semiconductor switches may all be controlled jointly, switched in parallel, via one terminal. The variations of the individual characteristic curves which are produced by manufacturing tolerances between the switches and by different temperatures have only a minimal influence. This decreases the circuitry outlay in relation to individual measurement and the system.

Further advantages and exemplary embodiments of the present invention result from the description and the appended drawings.

It is understood that the above-mentioned features and the features to be explained hereafter are usable not only in the particular specified combination, but rather also in other combinations or alone, without departing from the scope of the present invention.

DETAILED DESCRIPTION

Figure 1:
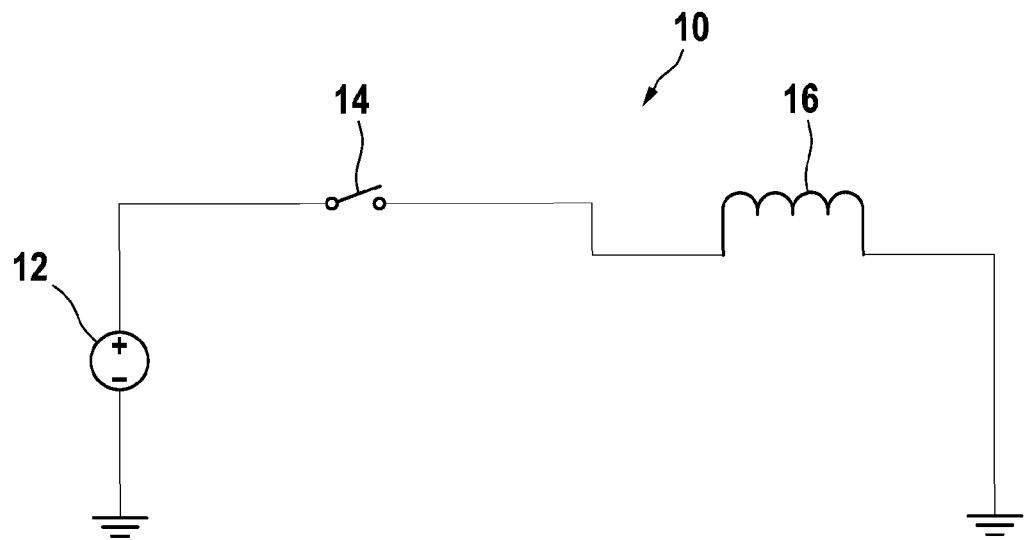
FIG. 1 shows a system according to the related art.

The present invention is schematically shown in the drawings on the basis of exemplary embodiments and will be described in greater detail hereafter with reference to the drawings.

FIG. 1 shows a system 10 according to the related art. The illustration shows a DC source 12, a switch 14, and an inductor 16, which represents the electric machine to be operated. The current flow is switched using switch 14. During switch-on by actuating switch 14 a high current flow, up to 1000 A, is effectuated which may result in the collapse of the supply voltage.

Figure 2:
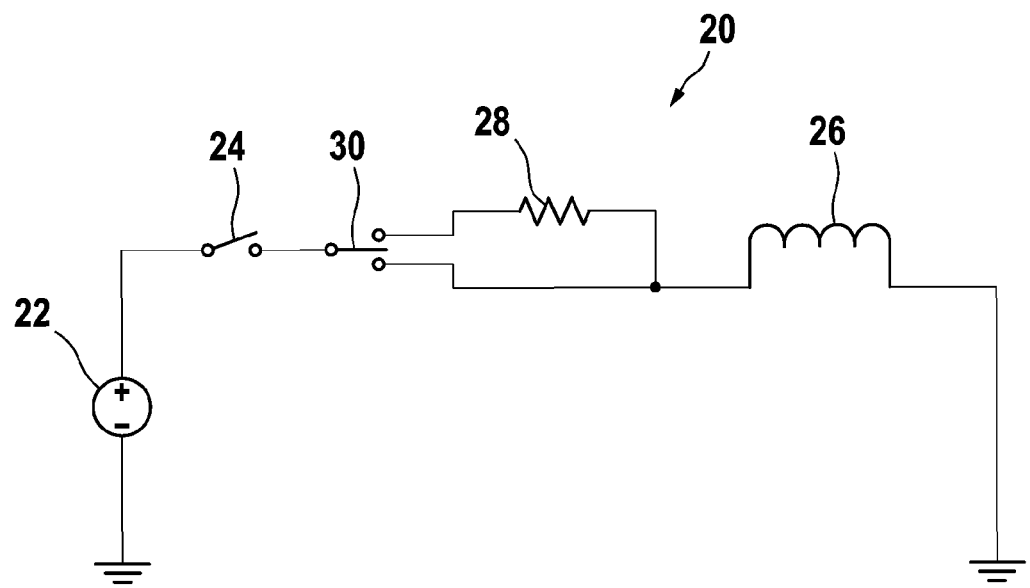
FIG. 2 shows another system according to the related art.

FIG. 2 shows an alternative system 20 according to the related art. A DC source 22, a switch 24, and an inductor 26 are again provided. Furthermore, a fixed resistor 28 and a further switch 30 are provided. Resistor 28 may be switched into the current flow using this further switch 30, whereby the current flow may be limited. This resistor 28, which is not adaptable, will sometimes become very hot, however, and requires a large installation space, in particular if the switch is implemented as a mechanical relay.

Figure 3:
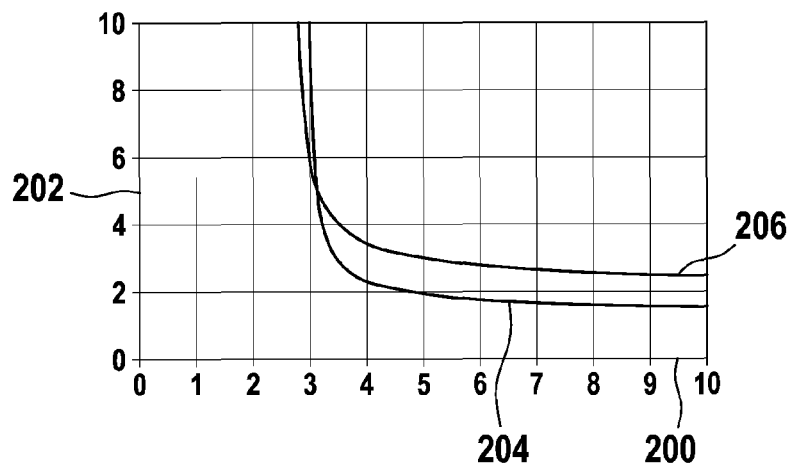
FIG. 3 shows a typical curve of the gate source voltage of a MOSFET.

FIG. 3 shows a typical curve of gate source voltage $U_{GS}$ at various temperatures. $U_{GS}$ in volts is plotted on an abscissa 200 and the current from drain to source $I_{DS}$ in amperes at a resistance $R_{DS(on)}$ in the milliohm range is plotted on an ordinate 202. A first curve 204 shows the curve at a temperature $T_J$ of 25° C., a second curve 206 shows the curve at $T_J$=125° C.

Upon a use of power MOSFETs in a power limiting module, as is known from the related art, switching losses are minimized. These switching losses are often higher than the losses in the conductive state. In order to keep these losses as small as possible, the switchover must take place as rapidly as possible. During the shutdown, the gate is first charged with electrons like a capacitor. These electrons must be "sucked" out of the gate in the shortest possible time and dissipated to ground. The time required for this purpose, the so-called shutdown time, is determined by the gate capacitance and the internal resistance of the control stage.

Figure 4:
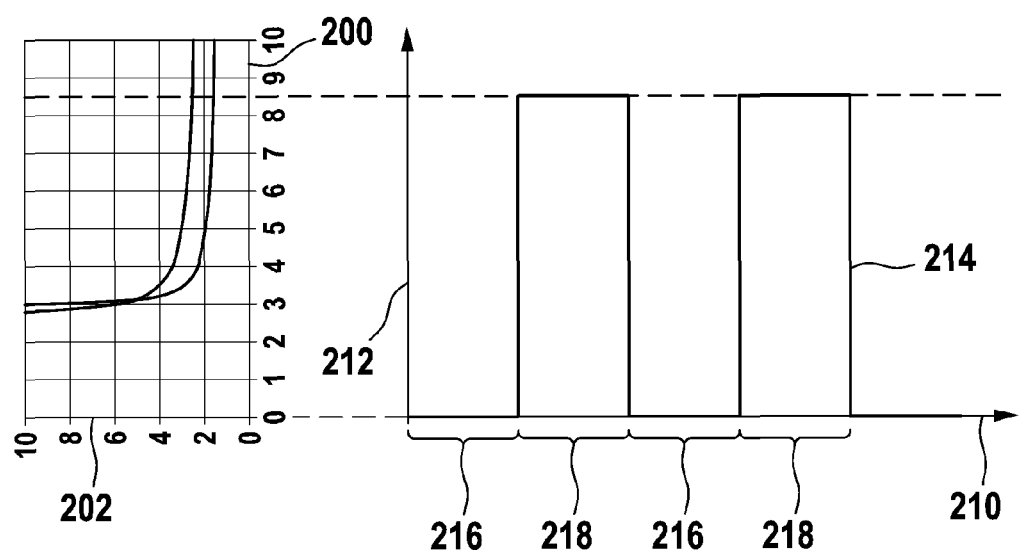
FIG. 4 shows a system according to the related art.

FIG. 4 shows the system according to the related art. The time is plotted on an abscissa 210. $U_{GS}$ is plotted on an ordinate 212. A curve 214 shows the clocked curve of this voltage, with $R_{DS(on)}$ going to infinity in shutdown phases 216 and $R_{DS(on)}$ going to 0 in startup phases 218.

Figure 5:
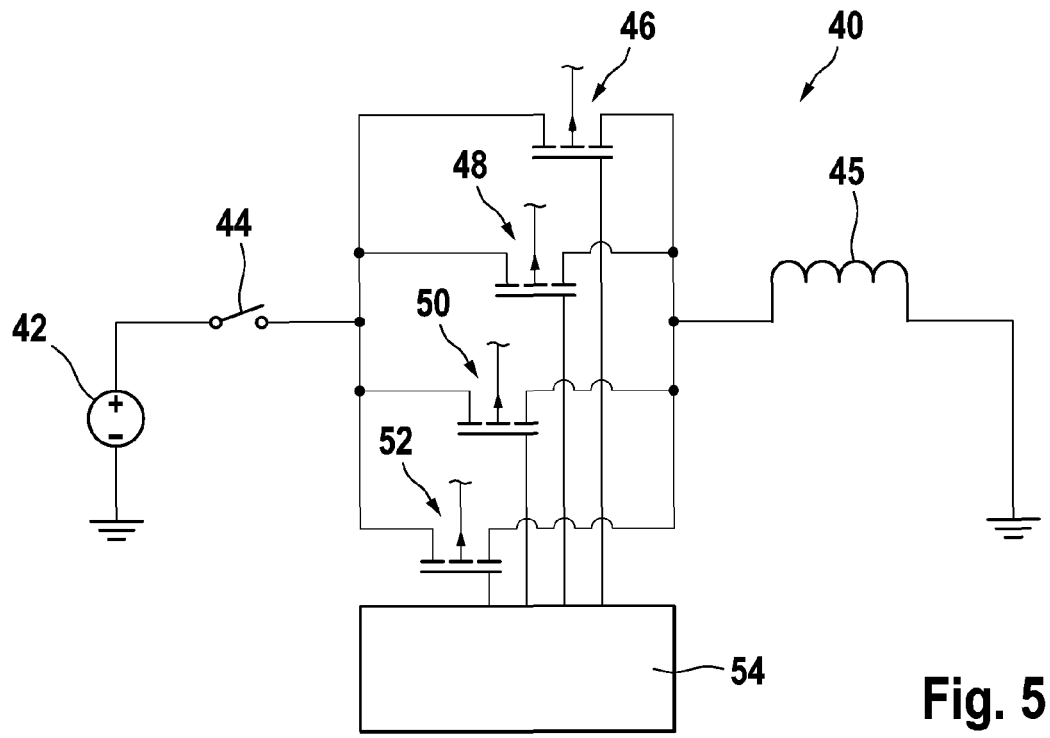
FIG. 5 shows an exemplary embodiment of the described system for carrying out the presented method.

FIG. 5 shows an exemplary embodiment of the presented system, identified as a whole by reference numeral 40. A DC source 42, a switch 44, and an inductor 45 are again shown.

Furthermore, four semiconductor switches 46, 48, 50, and 52 are shown, which represent an emulation of a series resistor, which is controllable. Semiconductor 46, 48, 50, and 52 are MOSFETs in this case. Furthermore, a trigger circuit 54 is provided, which is provided for controlling semiconductor switches 46, 48, 50, and 52. Fundamentally, the emulation may be implemented by one or multiple semiconductor switches.

Figure 6:
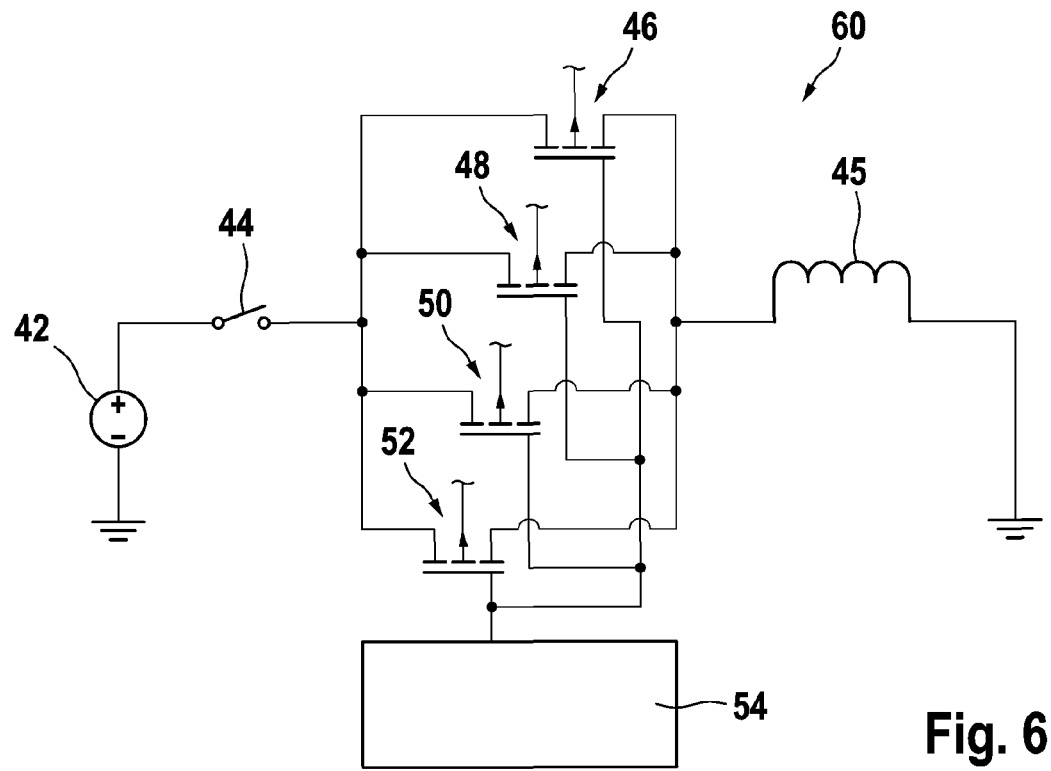
FIG. 6 shows another exemplary embodiment of the described system for carrying out the presented method.

FIG. 6 shows a further exemplary system 60 having the components or parts according to FIG. 5, semiconductor switches 46, 48, 50, and 52 being controlled in parallel in this case.

Figure 7:
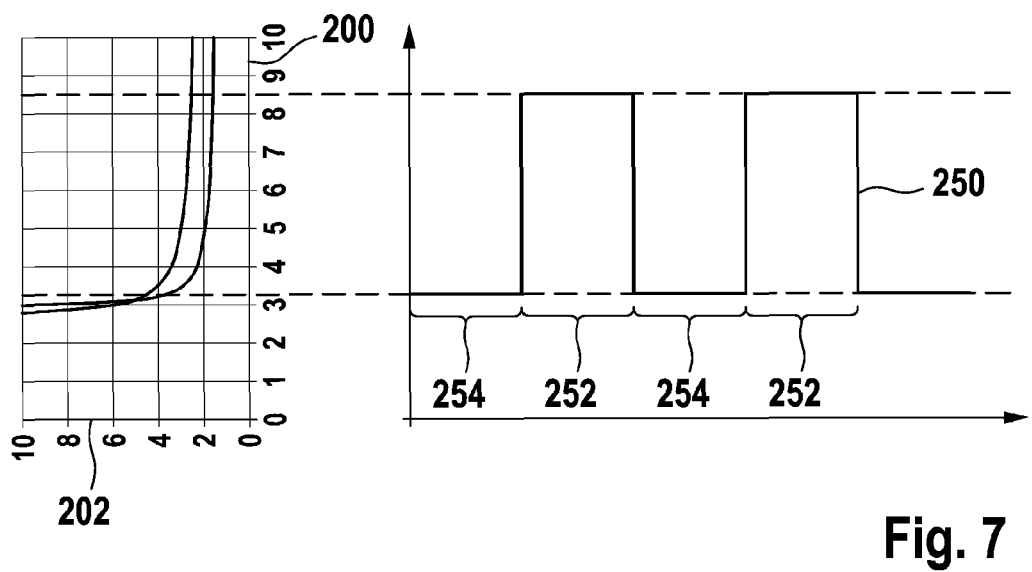
FIG. 7 shows an exemplary system according to the presented method.

FIG. 7 shows an exemplary system according to the presented method. A curve 250 shows the curve of $U_{GS}$, startup phases 252 and shutdown phases 254 being recognizable. The pulse signal is clocked, complete blocking or shutdown of the semiconductor switches being caused in shutdown phases 254, in contrast to the system according to the related art.

Figure 8:
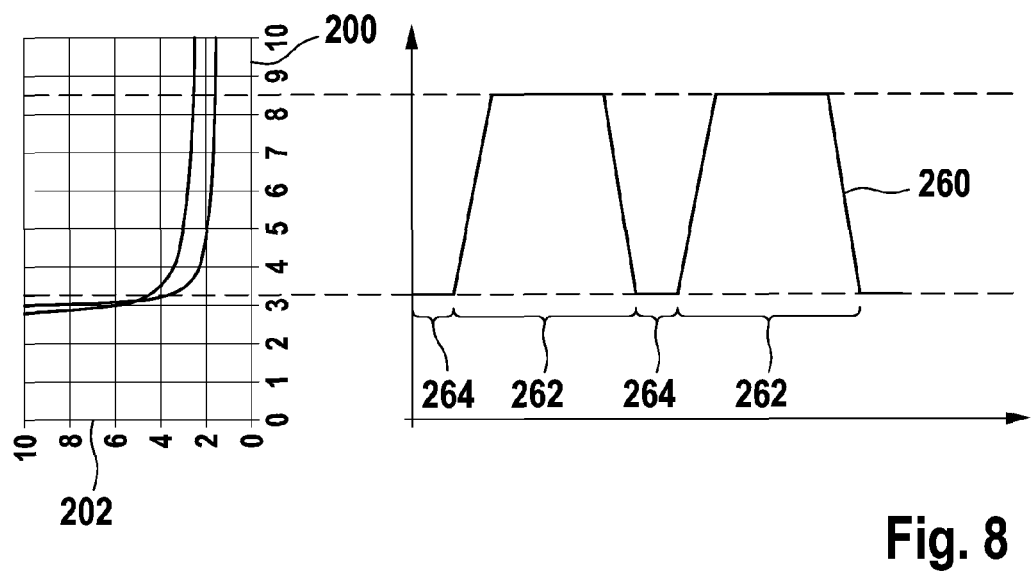
FIG. 8 shows another exemplary system according to the presented method.

In FIG. 8, a curve 260 shows the curve of $U_{GS}$. Startup phases are identified by reference numeral 262 ($R_{DS(on)} \rightarrow 0$); reference numeral 264 identifies the shutdown phases, in which complete shutdown of the semiconductor switch is not effectuated ($R_{DS(on)} \rightarrow OR_{lin}$).

FIGS. 7 and 8 show time curves of the control voltage according to the presented method. The semiconductor switch is not completely shut down in shutdown phases 254 and 264, but rather operated in a linear range having a finite $R_{DS(on)}$. In FIG. 7, this corresponds to a voltage $U_{GS}$ in the range from 2.8 V to greater than approximately 4 V. In FIG. 8, $U_{GS}$ is intentionally set having a reduced edge steepness between the two states "on" (phase 262) and "linear operation" (phase 264).

Figure 9:
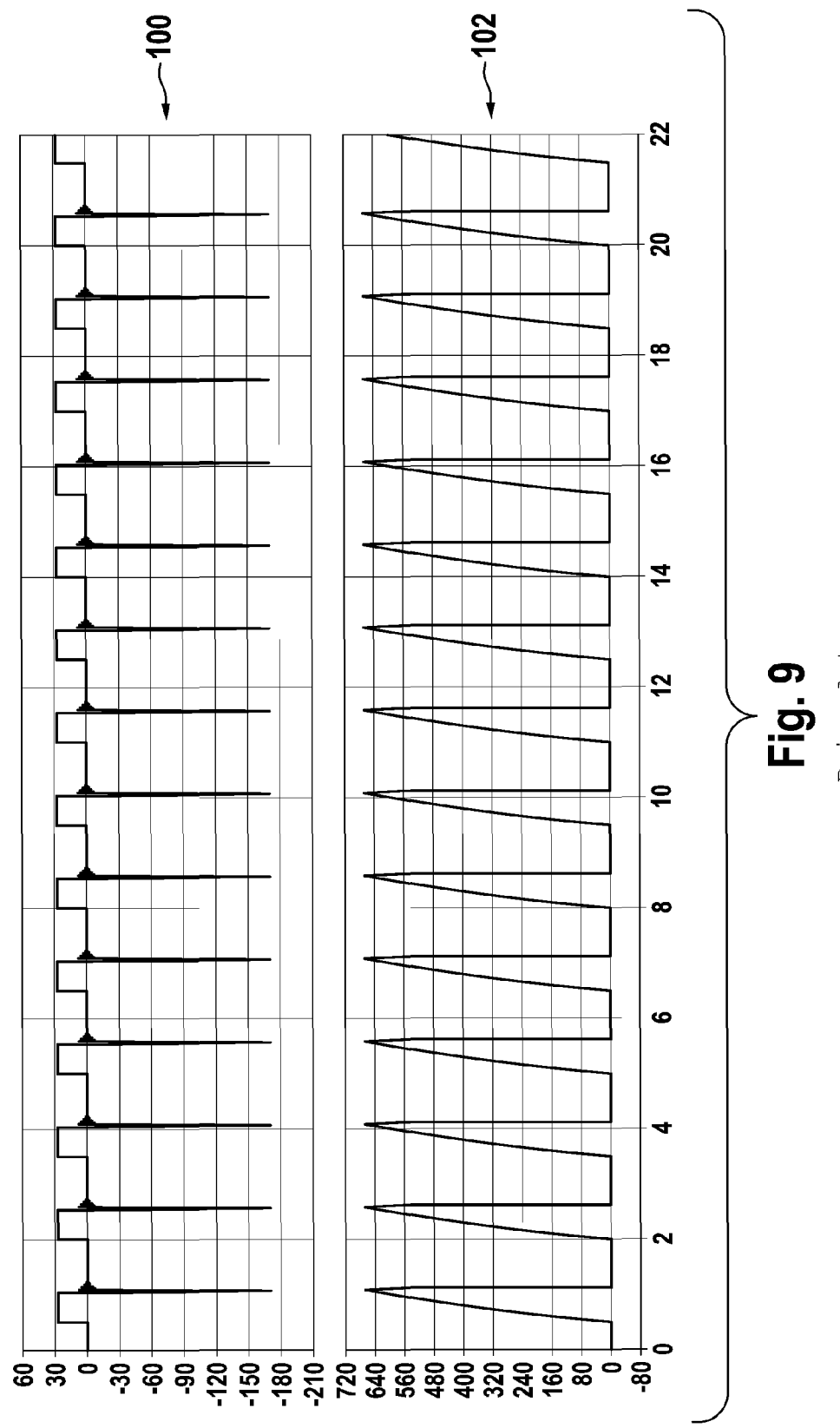
FIG. 9 shows curves of electrical variables during the activation according to the related art.

In FIG. 9, curves of electrical variables, specifically voltage 100 in volts and current 102 in amperes, are plotted over the time in milliseconds. A current pulsing having high, negative induced voltages during shutdown is apparent, in this case approximately −170 V. This corresponds to the system according to FIG. 4.

Figure 10:
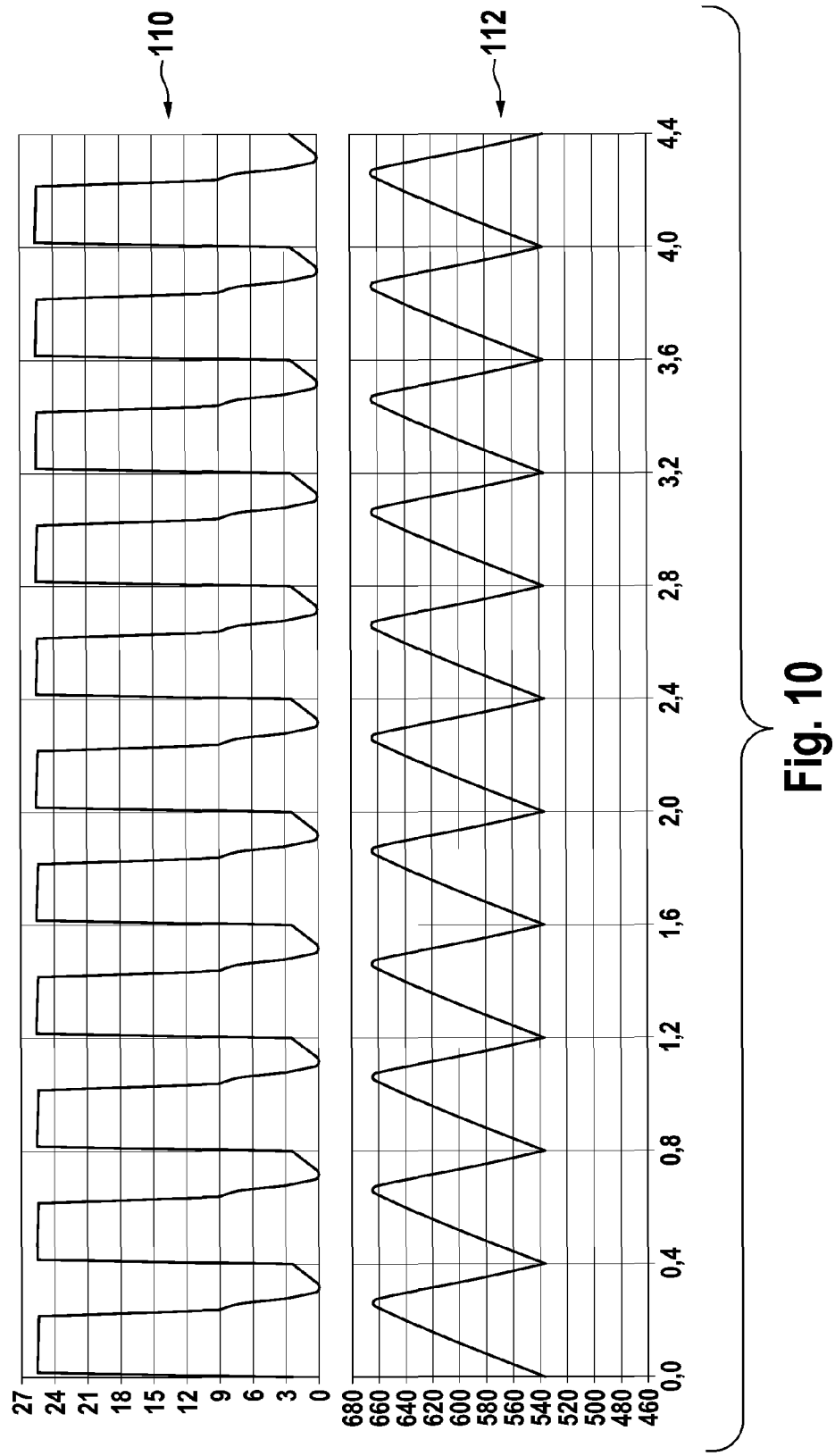
FIG. 10 shows curves of electrical variables during the exemplary system control according to the presented method.

FIG. 10 again shows electrical variables, voltage 110 in volts and current 112 in amperes. Due to the particular system having flatter control edges according to FIG. 8, high, negative induced voltage peaks are avoided.

Figure 11:
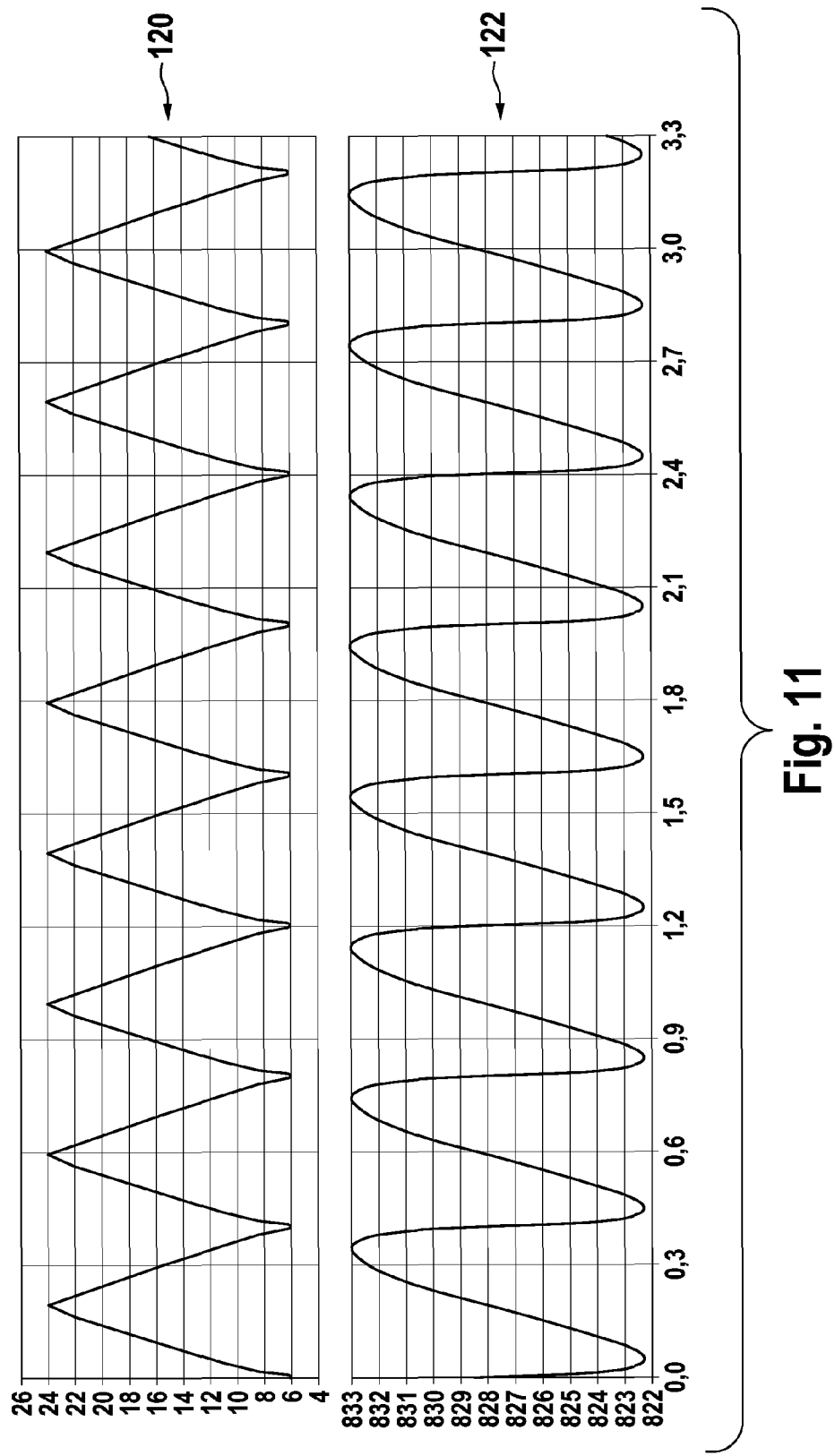
FIG. 11 shows curves of electrical variables during the exemplary system control according to the presented method.

In FIG. 11, the curves of voltage 120 in volts and current 122 in amperes are also plotted over the time in milliseconds. The illustration shows an exemplary embodiment of the system according to the present invention, in which high, negative induced voltages are avoided and the influence of individual characteristic curves is minimized.

Figure 12:
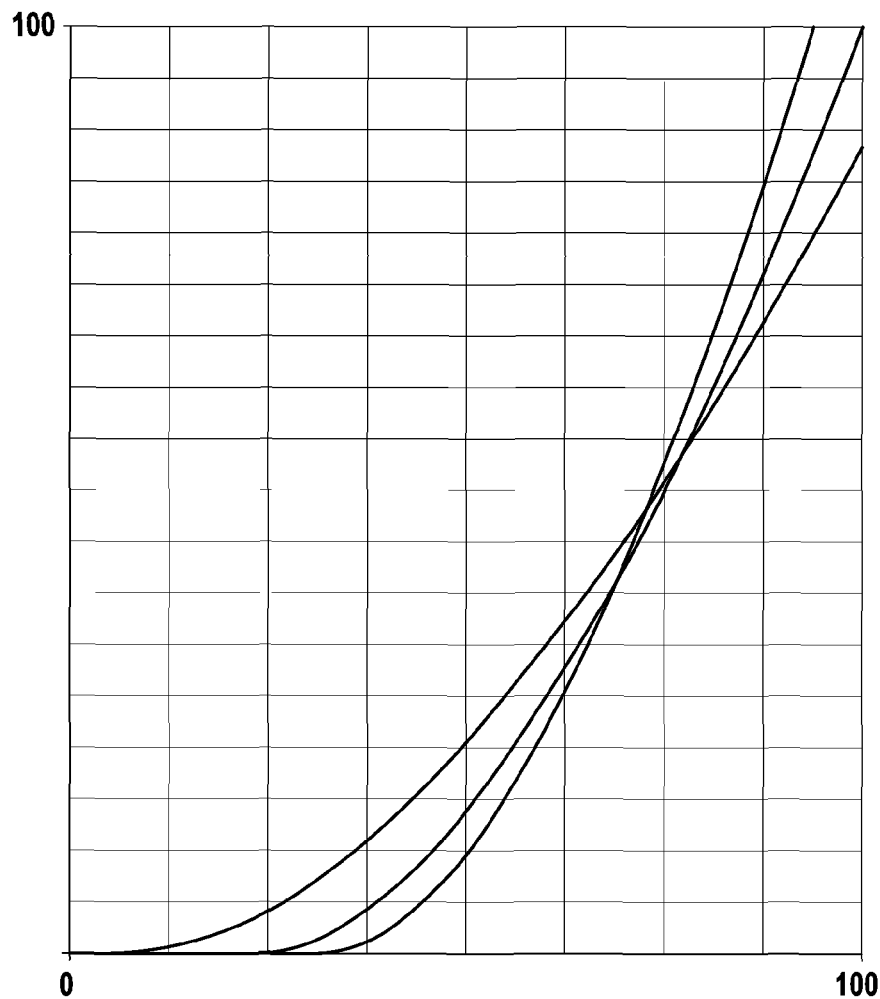
FIG. 12 shows the variation of the characteristic curves of MOSFETs in the event of a change in the temperature.

FIG. 12 shows the variation of the characteristic curves of MOSFETs upon a change in the temperature and the percentage change in this case.

A possible configuration of the described system includes multiple semiconductor switches, which are switched in parallel in the power pathway. These may be, for example, MOSFETs or IGBTs, gate terminals being able to be controlled in parallel. This is shown in FIG. 4, for example. The semiconductor switches are controlled in such a way that no high, negative induced voltages occur upon shutdown (FIG. 5) and simultaneously nearly the entire characteristic curve of the semiconductor is traversed so rapidly that deviations between the characteristic curves of the individual semiconductor switches (FIG. 8) are not significant.

In this way, the semiconductor switches which are switched in parallel have a uniform flow of current through them in the chronological mean, heat up uniformly, and thus achieve the maximum current carrying capacity. The shape of the pulse signal may be sinusoidal or triangular, for example.

Following Table 1 compares the presented method to known methods:

| $U_{on}$ [V] | $U_{off}$ [V] | $U_{peak}$ [v] | FIG. | Remark |
| --- | --- | --- | --- | --- |
| 20 | 0 | −270 | 4 | Related art |
| 20 | 4 | −27 | | According to the present invention |
| 20 | 4 | −25 | 8 | According to the present invention |
| 20 | 6 | +8 | 7 | According to the present invention |

What is claimed is:

1. A method for operating an electric machine in a starting phase, comprising:
   limiting a current using a controllable resistor that is, implemented by one or multiple semiconductor switches controlled using a clocked signal, the signal being set such that, in shutdown phases, the one or multiple semiconductor switches are not completely shut down, wherein, in the shutdown phases, the one or multiple semiconductor switches are operated in a linear range with a finite resistance.

2. The method according to claim 1, wherein the controllable resistor is implemented by the multiple semiconductor switches.

3. The method according to claim 2, wherein the semiconductor switches are individually activated.

4. The method according to claim 2, wherein the semiconductor switches are controlled in parallel.

5. The method according to claim 1, wherein the signal is determined by a clock ratio.

6. The method according to claim 1, wherein the signal is determined by a frequency.

7. The method according to claim 1, wherein the signal for the control has a reduced edge steepness.

8. A system for carrying out a method for operating an electric machine in a starting phase, the method comprising limiting a current using a controllable resistor, the controllable resistor being implemented by one or multiple semiconductor switches controlled using a clocked signal, the system comprising:
   the one or multiple semiconductor switches; and
   a control circuit, which provides the signal for controlling the one or multiple semiconductor switches;
   wherein the signal is set such that the one or multiple semiconductor switches are not completely shut down in shutdown phases, wherein, in the shutdown phases, the one or multiple semiconductor switches are operated in a linear range with a finite resistance.

9. The system according to claim 8, wherein the controllable resistor is implemented by the multiple semiconductor switches, and the multiple semiconductor switches, are switched in parallel in a power pathway.

10. The method according to claim 1, wherein the signal is a cyclic signal with repeating peaks and troughs, each trough causing a respective one of the shutdown phases.

11. The method according to claim 1, wherein the signal is set for current flow through the one or multiple semiconductor switches in the shutdown phases.

* * * * *